July 4, 1961
B. D. SCHWALM
2,990,667
FORAGE HARVESTER
Filed Aug. 11, 1959
2 Sheets-Sheet 2
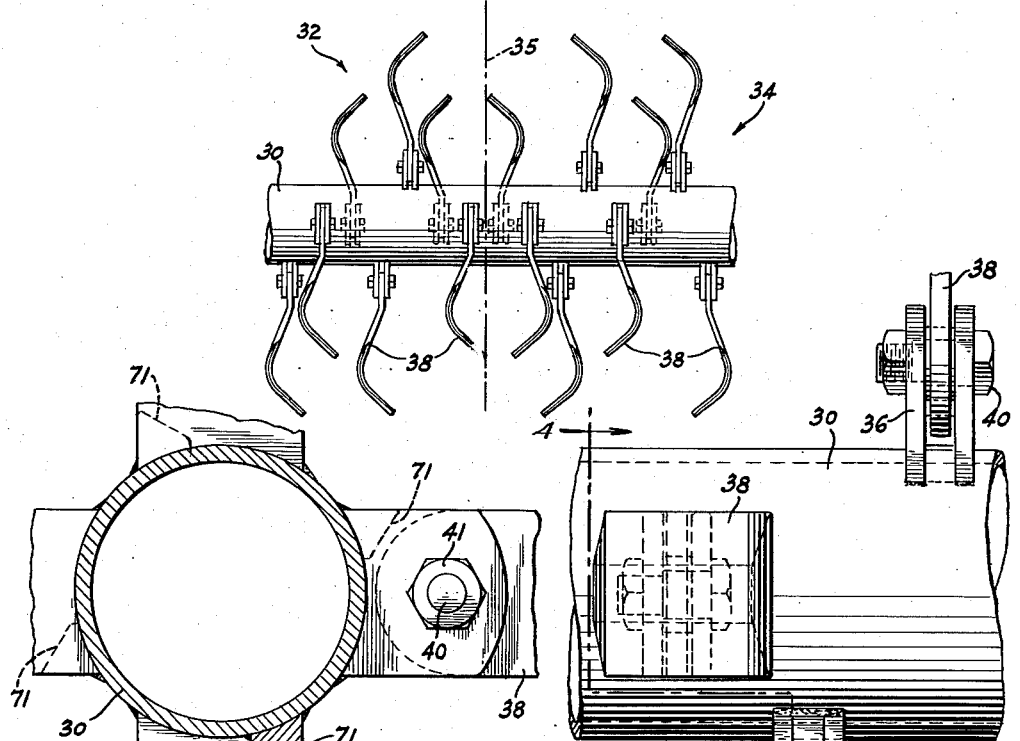
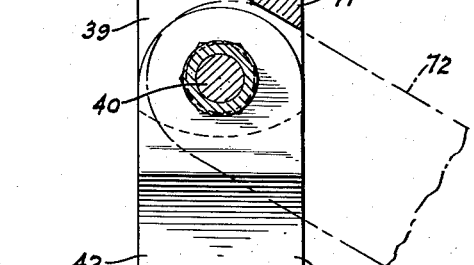
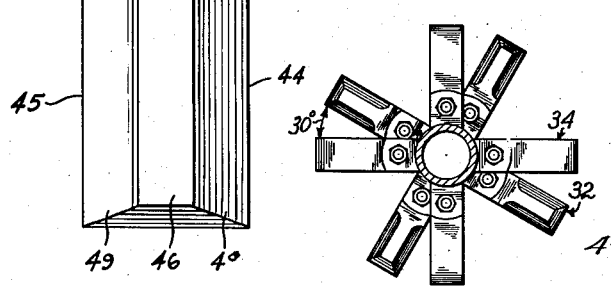
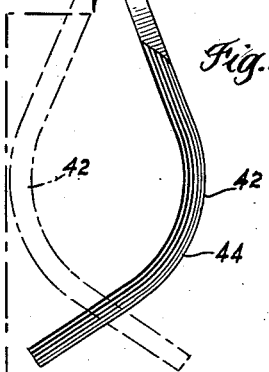
INVENTOR
BRUCE D. SCHWALM
By Joseph Allen Brown
ATTORNEY

United States Patent Office 2,990,667
Patented July 4, 1961

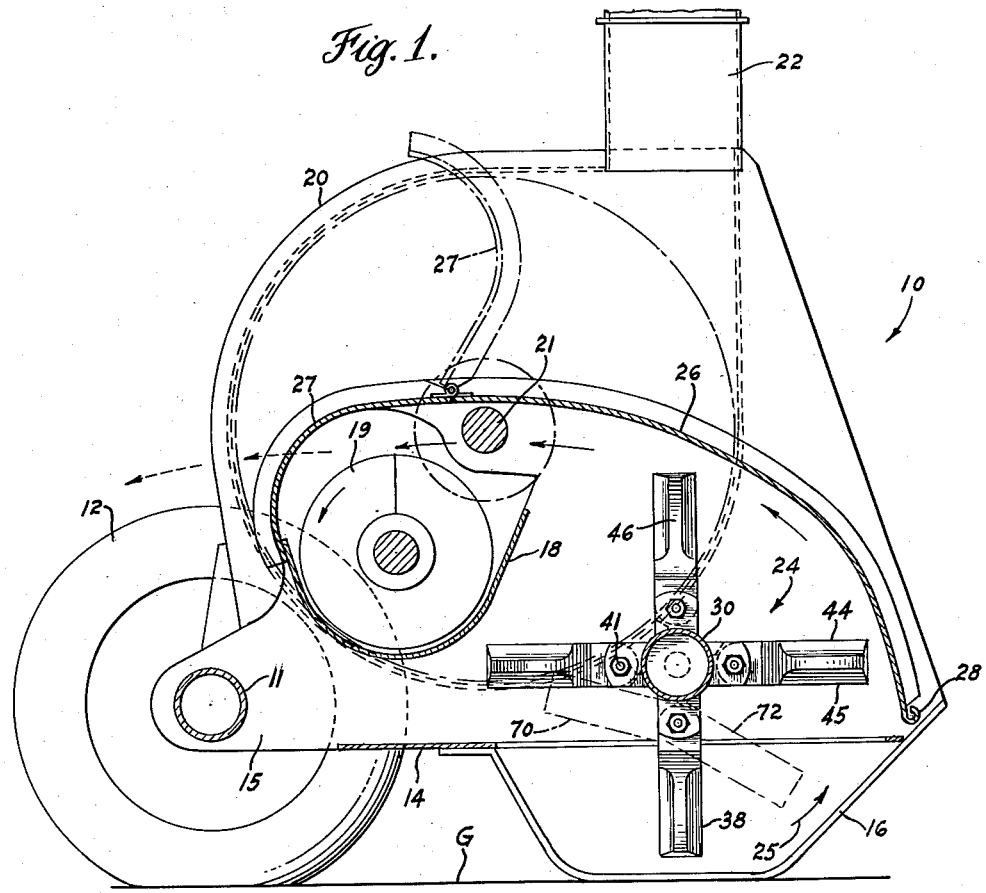

2,990,667
FORAGE HARVESTER
Bruce D. Schwalm, Leola, Pa., assignor to Sperry Rand Corporation, New Holland, Pa., a corporation of Delaware
Filed Aug. 11, 1959, Ser. No. 832,962
12 Claims. (Cl. 56—294)

This invention relates to agricultural equipment and more particularly to forage harvesters. Still more specifically the invention relates to forage harvesters of the flail type.

One conventional type of flail type forage harvester comprises a mobile frame adapted to advance over a field and harvest previously cut material or standing crops. The machine has an enclosure or hood open at its front and bottom so that the crop material may enter the machine. A rotor is provided having a plurality of knives or flails which 'chop' the crop and throw the cut material upwardly and rearwardly. The flail unit performs the dual function of a crop cutter and pick-up mechanism. It extends transverse relative to the direction of travel of the machine and delivers material upwardly and rearwardly to a transverse trough having an auger which conveys the material to one lateral end of the machine. A blower is mounted on the harvester frame to receive the material as it comes from the auger. The blower discharges the material upwardly through a discharge spout whereby the material can be conveyed to a wagon trailing behind the harvester. Commonly, a shear bar is provided at the inlet to the blower housing and the blower unit carries a plurality of knives cooperative with the shear bar to produce additional cutting of the material before it is blown through the discharge spout.

Flail type harvesters have become increasingly popular in recent years. The relative simplicity in design and construction of the machines makes them relatively low in cost and relatively easy to keep in operating order. One area of the machine which has produced considerable problems however, both from a manufacture and use standpoint, is the cutting and throwing mechanism or the flail unit. Conventionally, the flail unit comprises a tube or pipe having knives which extend radially therefrom. The number of knives on the rotor will vary according to the transverse length of the unit. However, it will be obvious that there has to be a sufficient number of knives that all of the crop material between two points will be cut off and picked up. The flails or knives have radial outer ends which are curved to provide cutting edges disposed transversely relative to the axis of the rotor. The transverse extension of the knives increases the effective length of the cutting edge and also provides a lifting effect on the material so that it will be more effectively and efficiently picked up and thrown to the transverse conveyor. The rotor on a flail type operates at high speed, such as 1400 r.p.m. There may be thirty or forty flail knives each of which may weigh two or more pounds, for example. Conventionally, the knives are connected to the rotor and spiralled around the periphery thereof to provide a continuous line of knives from one axial end of the rotor to the other. The cutting edges of the knives are arranged so that all of the crop material passed over is cut and picked up.

Because of the high speed of rotation of the flail unit and the spiral arrangement of the knives thereon, very substantial force couples are developed which tend to cause the rotor tube to whip. Further very substantial balancing problems are produced which have to be compensated for. This is accomplished by providing suitable weights at the opposite ends of the rotor whereby the flail unit as a whole may be dynamically balanced. One difficulty with this arrangement is that all of the knives have a specific mounting location and their curved cutting edges are so arranged that they will tend to avoid striking one another when the unit is operating. Since the knives are curved, they direct a throwing action on the material not only upwardly and rearwardly but toward the blower at one end of the transverse conveyor. The knives cannot be reversed, being provided with only one forwardly directed cutting edge. Moreover, the arrangement of the knives is such that any rearward swinging of the knives from a radial position has to be limited. If a given knife strikes an object on the ground as the flail unit is rotating, it is pivoted rearwardly. However, it is conventional to provide a stop which will limit the rearward swinging of the knife at 90° so that it does not strike the next trailing knife. In like respect, when the object has been passed over, the given knife or flail which has been pivoted rearwardly, whips back toward its radial position and its momentum carries it past such radial extension. If allowed to swing past its normal position, the knife would strike the rearward edge of the knife in front of it, particularly if such front knife was pivoted rearwardly. Therefore, it is also common to provide a stop which limits the forward swinging of each knife to a position perpendicular to the axis of the rotor on which they are carried. Everytime one of the knives swings rearwardly or forwardly after striking an object and then returning, the engagement of the knives with the stops on the rotor tube produce shocks which tend to increase the wear and tear on the machine and cause it to wear out more rapidly than if such stops could be eliminated or the forces so produced could be minimized. Further, the fact that each of the knives has only one cutting edge is undesirable since the knives are subjected to considerable punishment when the machine is in operation and the cutting edges become nicked and bent because of contact with ground objects other than the crop to be harvested. If the farmer could reverse the knives he could get double the wear out of them. Further, if the balancing of the flail unit could be simplified, manufacturing costs and problems would be reduced.

A primary object of this invention is to provide a flail arrangement which makes it possible to reverse the knives on the rotor shaft to make available a second cutting edge and thereby double the wear of the knives or flails.

Another object of this invention is to provide a knife arrangement which permits each flail or knife to fold back beyond a 90° point without falling into the path of a flail immediately following it.

Another object of this invention is to provide a flail arrangement which makes it possible for a given flail to swing forwardly of its normal radial extension, when it swings back toward normal position after having struck an object, the stopping of such flail in its forward travel being well past the radial line whereby the impact forces in stopping the flail are greatly minimized.

Another object of this invention is to provide an improved flail arrangement comprising knife units which are dynamically balanced separately and as a unit, and an overall flail arrangement which is also balanced.

A further object of this invention is to provide a flail unit comprising two sections each of which is independently statically and dynamically balanced, the knives on one section being adapted to be substituted for the knives on the other section and in such substitution being reversed whereby the flail unit as a whole can be provided with double the wear of conventional flail harvesters of this type.

A further object of this invention is to provide a harvester having a flail unit which will laterally consolidate the crop as it cuts and throws it whereby the material can be deposited on the ground behind the machine in a windrow without the necessity of providing cooperative deflectors or other means to secure the lateral consolidation of the material.

A still further object of this invention is to provide a flail type harvester having a rotor tube which can be balanced without the flails connected thereto.

A still further object of this invention is to provide a flail arrangement in which small units of flails are dynamically balanced and the internal force couples in the overall assembly are minimized thereby reducing the tendency for the rotor tube to whip.

A still further object of this invention is to provide a flail arrangement of the character described whereby the rotor can be manufactured as desired to provide a five, six or other foot length of rotor tube and still have a dynamically balanced unit.

A still further object of this invention is to provide a flail unit having knives which can be taken off and replaced by other types of flail elements without disturbing the balancing of the unit.

Other objectts of this invention will be apparent hereinafter from the specification and from the recital in the appended claims.

In the drawings:

FIG. 1 is a longitudinal vertical section through the center of a flail type harvester having a flail unit constructed according to this invention;

FIG. 2 is a front view of the flail unit looking from right to left in FIG. 1. In this view, and in FIG. 1, the flails are shown in their normal operating positions relative to their mounts;

FIG. 3 is a fragmentary front view similar to FIG. 2 showing the top and bottom flails in their normal positions but the front and rear flails folded 90° so that the axial relationship of the flails can be seen;

FIG. 4 is a fragmentary section showing the mounting of one of the flail knives. Such section is taken on the line 4—4 of FIG. 5 looking in the direction of the arrows;

FIG. 5 is a fragmentary elevation of the rotor on an enlarged scale showing one of the flails in one position in solid lines and in a reversed position in dotted lines to indicate how the flails can be mounted to utilize their double cutting edges.

FIG. 6 is a section through the shaft of a flail unit having knives mounted according to another embodiment of this invention.

Referring now to the drawings by numerals of reference, and first to FIG. 1, 10 denotes a flail type harvester which comprises a transverse axle 11 supported at its respective ends on ground wheels, one of which is shown at 12. Axle 11 has mounted thereon frame structure comprising base members 14, vertical side plates 15 and ground runners 16.

Extending parallel to axle 11 is a trough 18 in which an auger 19 is disposed and rotatable. At one axial end of trough 18 is the housing 20 of a blower and cutting mechanism, not shown, rotatable about the shaft 21 suitably journalled on the blower housing. The blower housing has a tangential discharge spout 22 through which material can be discharged and directed to a flailing wagon or the like, not shown.

The machine is adapted to travel toward the right in FIG. 1 being towed by a tractor or the like connected to a drawbar, not shown, on the machine. To both cut and pick up crop material on the ground G, a flail unit 24 constructed according to this invention is provided. The flail unit rotates as indicated by the arrow 25 in FIG. 1 and the severed crop material is thrown upwardly and rearwardly. A hood 26 is provided over both the flail unit and the auger trough 18 so that the crop material is guided and directed as it moves upwardly and rearwardly. The hood has a hinged section 27, which when in lowered position as shown in solid lines in FIG. 1, causes the crop to drop into trough 18, and when in elevated dotted position allows the crop to pass over the trough and be deposited behind the machine on the ground. The lower forward edge 28 of the hood is spaced vertically from ground G whereby the crop material is free to move under the hood and into the effective range of the flail unit 24.

The structure above described may be similar to that shown in U.S. Patent No. 2,871,643 issued February 3, 1959 and merely provides the environment of the improvement to which this invention relates, namely, the flail unit 24. Such will now be described.

Flail unit 24 comprises a tube rotor or shaft 30 which extends transverse to the direction of movement of the machine. When viewed as shown in FIG. 2, the direction of rotation of the tube is such that the bottom flails or knives move forwardly, upwardly and then rearwardly; or as shown in FIG. 1, the tube rotates counterclockwise. Tube 30 is suitably journalled in side plates of the machine and is driven from any conventional source of power and suitable connections, not shown. Mounted on tube 30 are two groups of flail knives, namely, group 32 and group 34. The perpendicular line 35 through tube 30 indicates the center line of the rotor. The knife group 32 is located to the left of center and the knife group 34 is located to the right of center. Each knife is mounted as shown best in FIGS. 4 and 5.

Radially extending relatively spaced ears or lugs 36 are provided for each knife. (FIGS. 4 and 5.) Each knife, denoted 38, has a straight radial shank end 39 which extends between the pair of lugs and is pivotally connected thereto by a bolt 40 and nut 41. The outer blade end 42 of each knife is turned or bent in one direction and then the other whereby the knife is bowed transversely to the direction of rotation of tube 30. Since each knife is curved, it has a longitudinal component relative to tube 30 and the curved surfaces provide a throwing function. The curvature of each knife assists in lifting the crop material and throwing it.

All of the knives on the flail unit are of identical construction. Each knife has two cutting edges 44 and 45. The curved outer end 42 of each knife has a medial portion 46 having opposite parallel sides and beveled surfaces 48 and 49 to thereby provide the cutting edges 44 and 45, respectively. Each knife is adapted to be mounted on the rotor tube with either its cutting edge 44 or its cutting edge 45 facing forwardly. As shown in FIG. 5, when the knife is mounted with cutting edge 44 facing forwardly, as shown in solid lines, the curvature of the knife extends transversely in one direction. When the knife is mounted in reverse position, dotted lines, the cutting edge 45 faces forwardly and the knife is curved transversely in the opposite direction. When the knife in FIG. 5 is in the solid line position, it tends to deliver material to the left. When the knife is in the dotted line position of FIG. 5 it tends to deliver material to the right.

It will be noted from FIG. 2 that all of the knives in group 32 are mounted so that the curved portions of the knives face toward the right or toward the center of the rotor. All of the knives in the group 34 are mounted so that they face toward the left and also toward the center of the rotor. When the flail unit is operated, knives cut off the standing crop material, or engage previously cut material resting on the ground, and convey it upwardly and rearwardly into the trough 18. The group of knives 32 in addition to throwing the material upwardly and rearwardly throw the material at an oblique angle toward the right of FIG. 2. On the other hand, the group of knives 34 cast the material upwardly and rearwardly and toward the left. Therefore, the opposite sets of knives laterally consolidate the material as they throw it rearwardly. If hood section 27 is left closed, the material will be deposited in trough 18 and conveyed by the auger 19 into the housing 20 whereupon it is blown and discharged therefrom into the trailing wagon or the like. If hood section 27 is left open the crop will be deposited on the ground and in a windrow.

As shown in FIG. 3, the knives are so disposed that they cut paths which overlap laterally, each knife having a transverse component which cuts a given width of crop material. Also, as shown in FIG. 3, it will be seen that even though the knives are pivoted from their normal radial position, they are arranged so that they will not strike one another. However, the arrangement of the knives is such that if they were disconnected from the ears or lugs 36 and then mounted again on the exact same ears from which they came, the mounting of the knives in FIG. 2 would be reversed. The knives in group 32 would face to the left and the knives in group 34 would face to the right. Such would be undesirable because the groups of knives would tend to direct the material toward the sides of the unit. Of more importance is the fact that when so reversed, the clearance pattern of the knives would be destroyed and the respective knives could strike each other if they pivoted back from normal radial position upon striking an object. Therefore, it has heretofore been considered that curved knives, as shown in the drawings, had to be mounted in fixed locations on the rotor tube and not be reversible, otherwise the cutting arrangement would be disrupted and the various flails would be striking each other when the unit is in operation. In flail harvesters having straight radially extending knives not transversely curved, it is common to have two cutting edges. However, it has not been known heretofore to provide two cutting edges on knives where they are transversely curved as in the present instance. With applicant's invention, the knives may be reversed so that both cutting edge of each knife may be utilized. So as not to disturb the arrangement of the knives on the tube 30 this is done by substituting the knives in group 32 for the knives in group 34, and vice versa. In other words, all of the knives in group 32 are removed when they become dull after considerable use. Likewise, all of the knives in the group 34 are removed. Then, the knives are reversed so that the cutting edges which have not as yet been used face forwardly. In remounting the knives, the knives in the group 32 are mounted where the knives 34 are formerly located. Conversely, the knives in group 34 are mounted where the knives in the group 32 were located. It will be apparent that when the knives are reversed in this fashion, the realtive position of the knives on the rotor is not changed. Therefore, no clearance or other problems are created. The very great advantage of this structure will be readily apparent, namely, double knife use.

Each knife weighs in the vicinity of two pounds and when the rotor 30 is rotating at high speed, very substantial forces are produced. When as in conventional structures the knives are mounted in a continuous spiral around the shaft, very great forces result which tend to make the rotor shaft whip. Further, the unit is unbalanced and it requires the provision of substantial weights on the ends of the rotor tube to dynamically balance the unit. In other words, in conventional structures the flail unit as a whole is dynamically balanced. By contrast, applicant mounts his knives in sub-units which are in themselves balanced units.

In the flail structure shown, there are thirty-two knives, there being sixteen knives in the group 32 and sixteen knives in the group 34. Each sixteen knives in a group are subdivided into units of four knives each. All four knife units are identical in arrangement and therefore only one unit will be described. The knives 50, 51, 52 and 54, shown at the left hand end of tube 30 in FIG. 2 comprise one unit. The knife 50, which may be referred to as a first knife, is mounted on tube 30 at a given angular and axial position thereon. The knife 51 or second knife is disposed 180° from knife 50 or at a diametrically opposite position on the tube 30. Also, it is axially spaced a given distance from the knife 50, as shown. The knife 52 or third knife is mounted in the same angular position as the knife 51 and is axially spaced from such knife. The knife 54 or fourth knife is mounted in the same angular position as the knife 50 and is spaced axially from the knife 52 the same distance as the axial spacing of the knives 50 and 51. As tube 30 rotates, knife 50 and knife 51 produce a moment or internal couple as indicated by the arrow 55. Knife 52 and the knife 54 produce a moment or internal couple as indicated by the arrow 56. Since each of the four knives is identical in weight and configuration, and since the relative mounting of the knives 50 and 51 on the one hand and the knives 52 and 54 on the other hand are the same, the moment 56 is opposite and equal to the moment 55. Thus they substantially cancel each other out and the knife unit provided by the knives 50, 51, 52 and 54 provides an arrangement which is both statically and dynamically balanced.

The second knife unit on rotor 30 is identical to the first unit but is displaced 90° relative thereto. The first knife 60 of the second unit is spaced angularly 90° from knife 50. The second knife 61 in the second unit is 180° relative to the knife 60. The third knife 62 is in the same angular position as the knife 61 and is diametrically opposite to the first knife 60. The fourth knife 64 is in angular alignment with the knife 60 and diametrically opposite to the knives 61 and 62. The axial spacing of the knives 60 and 61 on the one hand and knives 62 and 64 on the other hand are equal, such spacing being the same as the spacing between the knives 50 and 51 and 52 and 54 in the first unit. Therefore, the knives 60, 61, 62 and 64 provide a unit which is both statically and dynamically balanced. As stated, such unit is displaced 90° from the first unit. The knives 60 and 61 are disposed in axial positions between the knives 51 and 52. The knives 50, 51, 52, 54, 60, 61, 62 and 64 comprise half of the knives in group 32 and traverse one-fourth of the distance of tube 30. The other half of the knives in group 32 are mounted the same as the knives in the first half just described. Therefore, all of the knives in group 32 comprise an arrangement which in itself is balanced. If desired, the rotor tube could be cut in half on line 35, and one half of the flail unit could be used in one mechanism and the other half in another mechanism and each half unit would be balanced. This is not the case with arrangements in use heretofore.

Some weight variations result when the weld assembly of the rotor tube is constructed. Therefore, some balancing of the flail unit as a whole has to be provided. However, the flail knives themselves do not constitute an element in this balancing. The knives can be left off rotor tube 30 when the tube 30 is balanced. Thereafter, the knives can be added and the balance of the rotor 30 will not be disturbed. This greatly simplifies the manufacturing procedure and greatly simplifies the problem of providing a balanced flail unit. As will be apparent, if the flail unit 25 is not dynamically balanced when it is in operation, the vibrations and other forces which develop would cause the mechanism to rapidly wear out and fall apart.

The knives in the group 34 are mounted the same as the knives in the group 32 except that their curvatures face in the opposite direction. Further, as a group, the knives in group 34 are preferably angularly disposed 30° relative to corresponding knives in group 32, as shown in the embodiment of the invention illustrated in FIG. 6. This is done so that the knife in group 32 closest center line 35 will not throw material against the knife in group 34 closest line 35, and vice versa. There are four units of four knives each, each unit comprising knives mounted as previously described to provide a statically and dynamically balanced sub-unit. All four units are mounted on the shaft 30 to provide an overall arrangement which is also dynamically balanced.

One very substantial advantage with this structure is that all of the knives can be removed and other dissimilar flails can be mounted on the rotor. This can be done without disrupting the rotor balance. Such is not the case with a conventional machine wherein the flail unit, flails included, constitute the balanced unit. Since the flail unit is conventionally balanced as a whole by weights on the rotor shaft, removal of the knives and substituting therefor other knives of a different weight would throw the entire balance off. However, with applicant's structure, even though different flails are mounted on the unit, the balancing will nevertheless remain. It will be understood, of course, that the flails substituted for the flails shown will all be the same size and weight. However, the substituted flails do not have to be the same weight as the flails which they replace. Such is made possible by the fact that the rotor tube weld assembly is balanced without the flails. The flails themselves are arranged in balanced groups.

Since the knives are mounted so that they swing in independent paths and do not cross each other, other than in the paths which they cut, if a knife engages a rock or other object it can be allowed to swing rearwardly as far as the physical mounting of the flail on the rotor 30 will permit. For example, assume that the lower knife in the flail unit, as shown in FIG. 1, strikes an object. It will then swing rearwardly relative to the direction of rotation of the unit to the dotted position 70, pivoting about the axis of the bolt 40. With a conventional structure, it would be necessary to stop such flail at a 90° point or less of rearward swinging movement. Otherwise, it would strike the next trailing flail. However, with applicant's arrangement the knife will never engage the flail trailing behind it and therefore it does not have to be stopped at 90° by a suitable stop provided. The flail will come to a stop when its trailing edge engages the periphery of the rotor 30. As shown in FIG. 1, the rearward swinging of the knife may exceed 100° and nevertheless not encounter the trailing knife. The advantage of this arrangement is that the further the knife can swing rearwardly the greater the objects it can pass over without damaging the flail unit.

When a given knife is in a pivoted rearwardly position as indicated by the dotted line 70, it will be understood that the flail unit continues to rotate. When the knife is free of the object which caused it to pivot, it will swing back toward its normal radial position. However, the momentum of such swing will carry it past its normal radial extension and swing it forwardly in the direction of travel. A stop 71 is provided on the tube 30 for each knife to engage its associated knife and stop it on a forward swinging movement at a point approximately 60° past its normal radial position. The forward position of the knife is indicated by the dotted lines 72. Normally, flail knives and other mechanisms are stopped in their forward swing when they reach their normal radial position. Swinging movement past this point is not permitted. Otherwise the knife immediately in front of it might be hit. This will result if the knife in front of it is also pivoted rearwardly at that moment. However, with applicant's arrangement the knives are permitted a certain amount of forward swing and each flail will be brought to a stop well after its point of peak velocity, namely, its point where it is extending radially. Heretofore, it is found that the flails rapidly beat down and wear off the stops which control them where the stops try to hold the flails at a 90° extension. However, with the stops 60° beyond that point, the impact loads upon the stops 71 are much less and the stops last a much longer period of time.

Another substantial advantage of the flail unit described above is that since the knives are in units of four which are themselves statically and dynamically balanced, the flail unit as a whole has far less tendency to whip than flail units of prior design. This tendency to whip brings about a premature wearing out of the supporting structure for the rotor. Also, it causes premature wearing of the flails. Further, with the present design the length of the flail unit can be established as desired. Additional knives can be added to groups 32 and 34 without disrupting the balance arrangement. It will be understood of course that the knives will be added in balanced units of four to maintain the advantages described above. The addition of knives to present flail units cannot be done without rebalancing the entire flail apparatus. Therefore, with applicant's structure, the flail units can be built five, six or seven feet long, as desired, and balancing the units is no problem.

The very great advantage of having flail knives which can be reversed to provide two cutting edges will be readily apparent. The operation and maintenance of the machine is greatly simplified.

Since the group of knives 32 feeds the material slightly toward the right as it moves the material upwardly and rearwardly and since the group of knives 34 feeds the material slightly toward the left of FIG. 2, the side walls of the harvester are kept clear of material. This is a highly desirable result and protects the supporting structure at the respective ends of the flail unit from being fouled with crop material. Further, by opening or closing hood section 27 the crop material can be directed to the blower or deposited on the ground in a windrow. No deflector plates or the like are needed to achieve this highly desirable result. Since the groups of knives are substituted one for the other when the knives are reversed, the relative arrangement and throwing action of the knives is not changed. In view of the greater swing back in both a forward and rearward direction provided for each of the knives, the impact loads to which the rotor 30 is subjected are greatly minimized and the flail unit will have a very long life.

While this invention has been described in connection with a particular embodiment thereof, it will be understood that it is capable of further modification, and this application is intended to cover any variations, uses or adaptations of the invention following in general, the principles of this invention and including such departures as come within known or customary practice in the art to which the invention pertains and as fall within the scope of the invention or the limits of the appended claims.

Having thus described my invention, what I claim is:

1. In agricultural machinery, crop cutting mechanism comprising a frame, a rotatable shaft mounted on said frame, a balanced cutting unit mounted on said shaft and rotatable therewith, said unit comprising four knives only, means connecting each knife of said unit to said shaft, said knives comprising a first knife disposed in a given angular and axial position on said shaft, a second knife disposed diametrically opposite to said first knife and spaced axially in one direction on said shaft relative to the first knife, a third knife in angular alignment with said second knife and spaced axially in said one direction relative thereto, and a fourth knife in angular alignment with said first knife and spaced axially in said one direction from said third knife, the axial spacing between said first and second knives and said third and fourth knives being substantially the same.

2. In agricultural machinery, crop cutting mechanism as recited in claim 1 wherein a second balanced cutting unit, the same as the first cutting unit, is mounted on said shaft, the first knife of said second unit being mounted axially between said second and third knives in said first unit and being angularly spaced 90° from the first knife in the first unit and in trailing relation relative thereto as said shaft rotates.

3. In agricultural machinery, crop cutting mechanism as recited in claim 2 wherein each knife is connected to said shaft for pivotal movement about an axis parallel to the axis of the shaft.

4. In agricultural machinery, crop cutting mechanism as recited in claim 3 wherein each knife of both cutting units has an outer radial cutting end which is curved whereby said cutting end extends transverse of a radial plane through the connection of the knife to the shaft whereby each knife cuts a given width of material, said knives being mouted to cut in overlapping paths.

5. In agricultural machinery, crop cutting mechanism as recited in claim 2 wherein each knife of both units is free to pivot in excess of 90° rearwardly relative to direction of rotation of said shaft, the positioning of said knives and the curved cutting ends thereof being such as to preclude interference between one knife and the closest knife trailing it.

6. In agricultural machinery, crop cutting mechanism as recited in claim 2 wherein each knife is free to pivot forwardly relative to the direction of rotation of said shaft a substantial distance beyond its normal radial extension.

7. In agricultural machinery, crop cutting mechanism as recited in claim 6 wherein a stop is provided for each knife to limit said forward pivoting at approximately 60° from said normal radial extension.

8. In agricultural machinery, crop cutting mechanism as recited in claim 2 wherein all of said knives are similarly curved and tend to deliver cut material in said one direction.

9. In agricultural machinery, crop cutting mechanism as recited in claim 2 wherein said first and second knife units comprise a first group of knives, there being a second group of knives the same as said first group and arranged on said shaft spaced in said one direction from the first group, the knives of said first group being curved to tend to deliver material in said one direction and the knives of said second group being curved to tend to deliver material in a direction opposite to said one direction.

10. In agricultural machinery, crop cutting mechanism as recited in claim 9 wherein the knives in said second group are angularly displaced 30° relative to corresponding knives in said first group.

11. In agricultural machinery, crop cutting mechanism as recited in claim 10 wherein all of the knives have two cutting edges whereby each knife is reversible, the knives in said first group being adapted to be removed, reversed and then substituted for knives in said second group and vice versa.

12. In agricultural machinery, crop cutting and windrowing mechanism comprising, a mobile frame, a rotatable shaft mounted on and extending transverse to the travel of said frame, a first group of knives mounted on one axial half of said shaft and being curved to cut and throw material rearwardly and toward the other axial half of said shaft, a second group of knives mounted on the other axial half of said shaft and being curved to cut and throw crop material rearwardly and toward said one axial half of said shaft, the knives in said second group being the same in number and mounting arrangement as the knives in said first group, each group of knives comprising a first unit having four knives only, means connecting said four knives to said shaft, said four knives comprising a first knife disposed in a given angular and axial position on said shaft, a second knife disposed diametrically opposite to said first knife and spaced axially in one direction on said shaft relative to the first knife, a third knife in angular alignment with said second knife and spaced axially in said one direction relative thereto, and a fourth knife in angular alignment with said first knife and spaced axially in said one direction from said third knife, the axial spacing between said first and second knives and said third and fourth knives being substantially the same, each group of knives also comprising a second unit the same as the first unit, the first knife of said second unit being mounted axially between said second and third knives of said first unit and being angularly spaced substantially 90° from the first knife in the first unit and in trailing relation thereto as the shaft rotates, and a hood mounted on said frame and over said first and second groups of knives, said hood having a rearward opening for the discharge of material from said first and second groups of knives, and means for closing said opening.

References Cited in the file of this patent

UNITED STATES PATENTS

| | | |
|---|---|---|
| 2,506,054 | Agee et al. | May 2, 1950 |
| 2,633,687 | Bannister | Apr. 7, 1953 |
| 2,711,067 | Mott | June 21, 1955 |
| 2,777,268 | Breed | Jan. 15, 1957 |
| 2,827,745 | Taylor | Mar. 25, 1958 |
| 2,836,023 | Caldwell | May 27, 1958 |